Feb. 14, 1967  J. E. KOWALSKI ETAL  3,303,710
VARIABLE SPEED PULLEY DRIVE
Filed Dec. 23, 1964  2 Sheets-Sheet 1

INVENTORS
JOHN E. KOWALSKI
HAROLD A. NELSON
BY M. A. Hobbs
ATTORNEY

INVENTORS
JOHN E. KOWALSKI
HAROLD A. NELSON
BY

ATTORNEY

United States Patent Office 3,303,710
Patented Feb. 14, 1967

3,303,710
VARIABLE SPEED PULLEY DRIVE
John E Kowalski, Mishawaka, and Harold A. Nelson, South Bend, Ind., assignors to Dodge Manufacturing Corporation, Mishawaka, Ind., a corporation of Indiana
Filed Dec. 23, 1964, Ser. No. 420,689
6 Claims. (Cl. 74—230.17)

This invention relates to variable speed drives and more particularly to an adjustable speed sheave for use either alone or in combination with variable speed sheaves.

Adjustable sheaves of the V-belt type are extensively used in the power transmission field and are frequently operated in combination with a variable sheave which is automatically varied whenever a change in the setting is made in the adjustable sheave. The prior sheaves have generally had complicated mechanisms for adjusting the speed or have been difficult to adjust accurately to the desired rate of speed and have involved difficulty in maintaining the selected setting for an indefinite period of operation. Variable speed drives of this type are often required to operate for extended periods of time under heavy loads, and are consequently subjected to accelerated and excessive wear, particularly in the slidable sheave parts involved in the adjustments for different speeds. As a result of these prolonged adverse operating conditions, a substantial amount of scoring and wear occurs in the parts subjected to the relatively sliding contact, ultimately interfering with the proper operation and adjustment of the sheave and necessitating the eventual replacement of individual parts or of the complete sheave. It is therefore one of the principal objects of the present invention to provide an adjustable sheave which is so constructed and arranged that it can readily be accurately adjusted to the desired setting and which will effectively maintain the setting without attention or further adjusting from time to time.

Another object of the invention is to provide a relatively simple, easily adjusted sheave which can effectively be adjusted manually to the desired speed while the drive is in operation, and which is so constructed that it can easily be inspected and serviced without removing the sheave from the shaft on which it is mounted.

Still another object of the invention is to provide a compact, sturdy and versatile adjustable pitch sheave which can be easily fabricated, assembled and installed using only standard equipment and tools, and which can thereafter be readily serviced and repaired in the field using easily installed and assembled parts of the subassembly.

A further object is to provide an adjustable pitch sheave of the aforesaid type, the parts of which are so constructed and arranged that they will withstand long, continuous operation without service and without developing any adverse conditions, such as vibration or hunting, interfering with optimum operation of the drive in which the sheave is used.

Another object of the invention is to provide an adjustable sheave in which the operating parts of the adjustment mechanism are fully enclosed within the sheave and which has an easily reached and manipulated adjustment operating means.

Additional objects and advantages of the present invention will become apparent from the following description and accompanying drawings, wherein.

Figure 1:
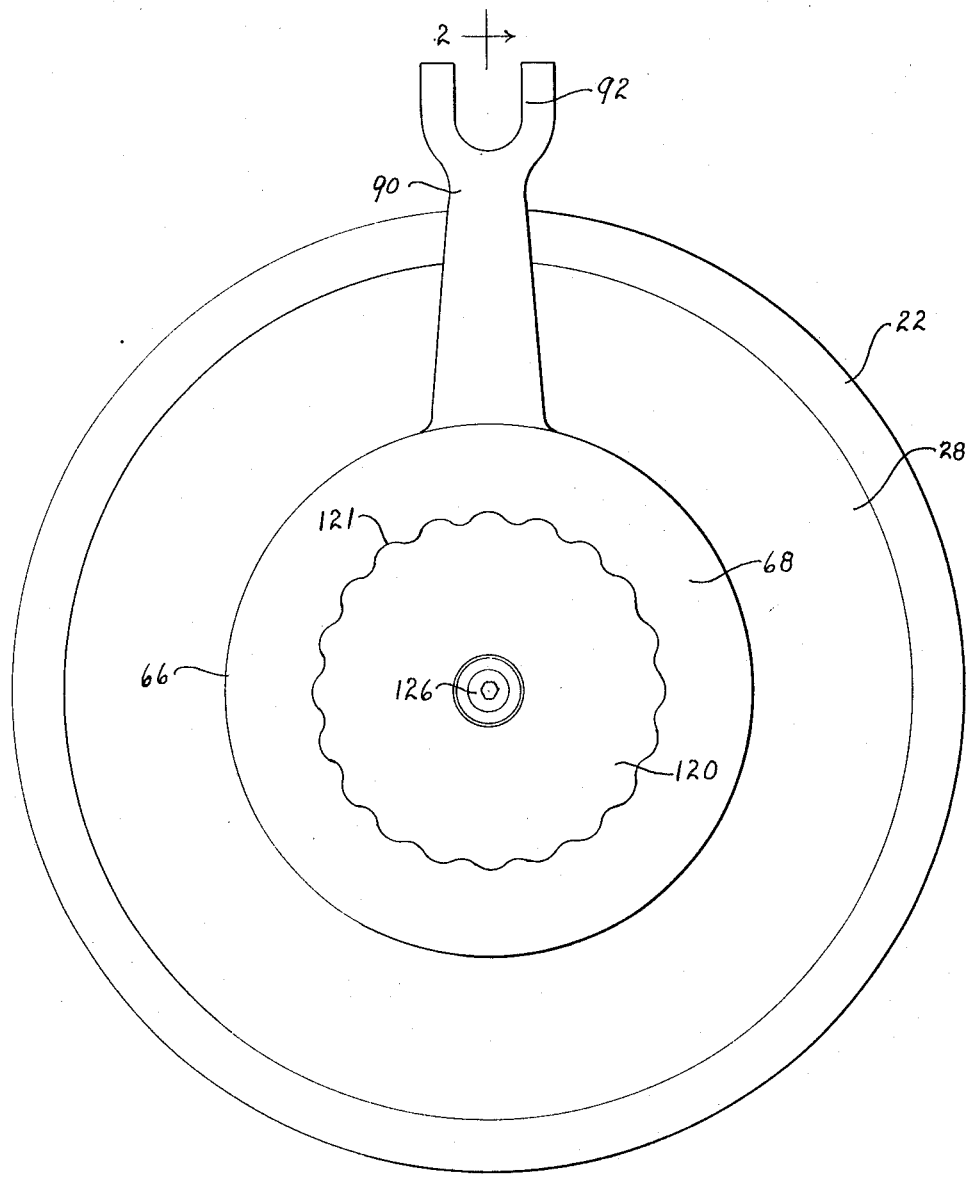
FIGURE 1 is an end elevational view of an adjustable sheave embodying the present invention.
Figure 3:
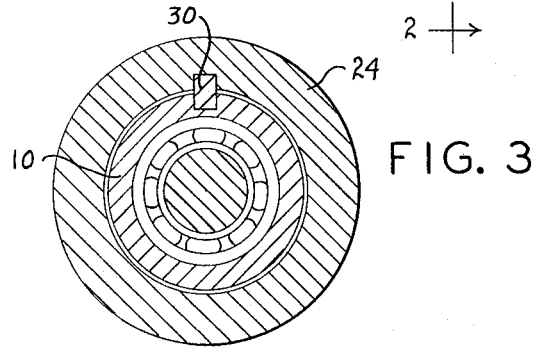
FIGURE 3 is a transverse cross sectional view of the sheave shown in the preceding figures, the section being taken on line 3—3 of FIGURE 2.
Figure 2:
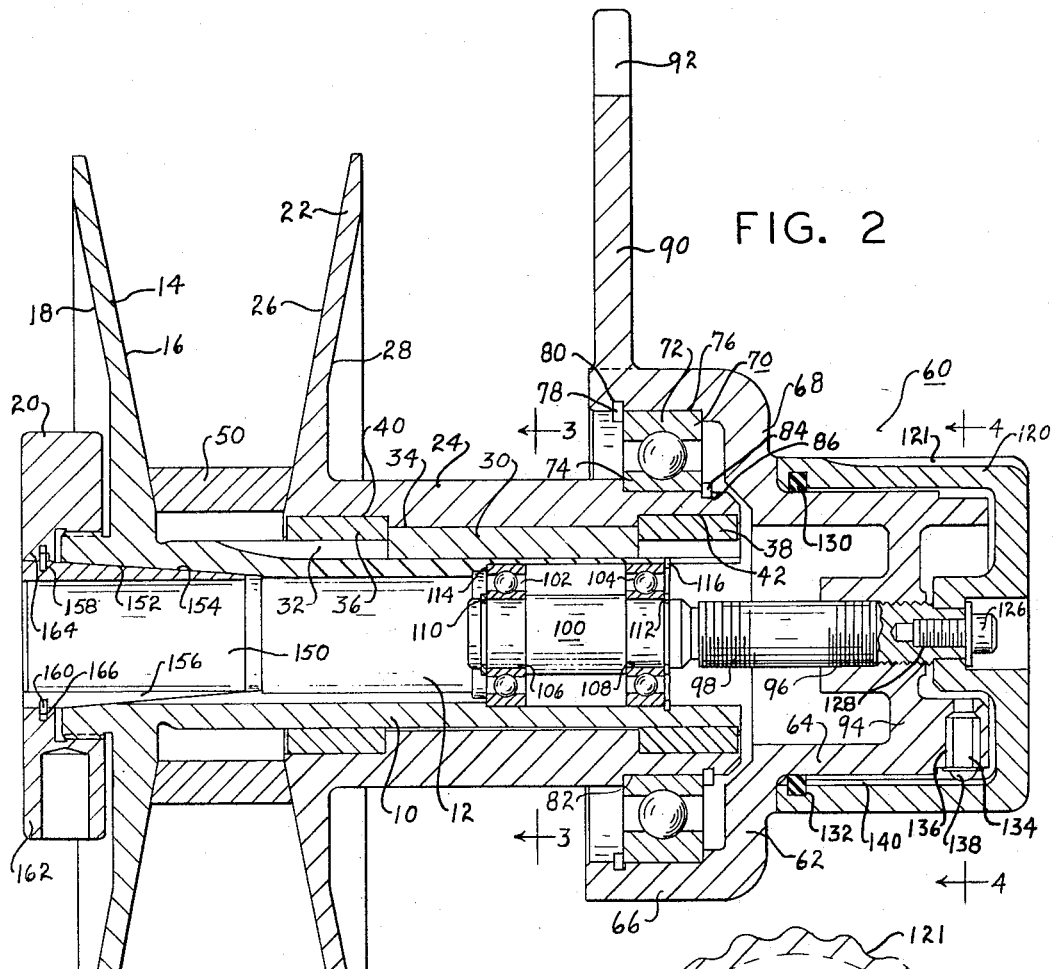
FIGURE 2 is a longitudinal cross sectional view of the adjustable sheave shown in FIGURE 1, the section being taken on line 2—2 of the latter figure.
Figure 4:
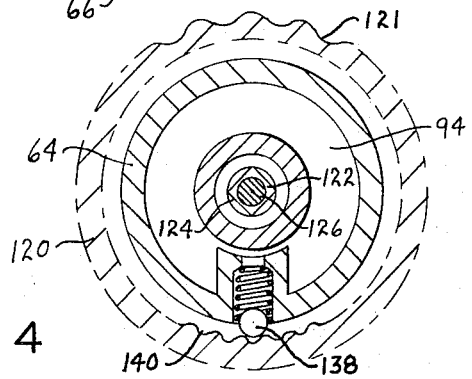
FIGURE 4 is a transverse cross sectional view of a part of the adjustment mechanism, the section being taken on line 4—4 of FIGURE 2.

Referring more specifically to the drawings, the present adjustable sheave consists of a hub 10 having a longitudinal center bore 12 extending the full length thereof. Mounted on the left-hand end of the hub, as viewed in FIGURE 2, and formed integrally therewith, is an inner flange 14 having a frusto-conical, belt-engaging surface 16 and a recessed outer surface 18 in which a sheave securing mechanism 20 is partially seated. Mounted on hub 10 is outer flange 22 joined integrally to the left-hand end of a sleeve 24, the sleeve being adapted to move longitudinally on the hub and move flange 22 toward and away from flange 14. Flange 22 is provided with a belt-engaging, frusto-conical surface 26 and a recessed outer surface 28, the same shape as the corresponding surfaces on flange 14. The sleeve is prevented from relative rotation with hub 10 by a key 30 seated in longitudinal slot 32 in the external surface of hub 10 and in slot 34 in the inner surface of sleeve 24. In order to facilitate sliding of sleeve 24 on hub 10, ring-shaped bearings 36 and 38 of graphite or other suitable non-friction material are preferably disposed between the sleeve and the hub at the two ends of the sleeve, bearing 36 being seated in an annular groove 40 and bearing 38 in an annular groove 42. A V-belt 50 is trained on the two belt-engaging surfaces 16 and 26 and is adapted to move from the position shown in FIGURE 2 to a position near the periphery of the two flanges as flange 22 is moved from the position shown in FIGURE 2 to a position in close proximity to flange 14 near the center portion thereof, the belt having its edges beveled to correspond to the bevel on the frusto-conical surfaces 16 and 26.

Flange 22 is moved toward and away from flange 14 to adjust the radial position of the belt 50 on the sheave by an adjustment mechanism generally indicated by numeral 60, mounted on the right-hand end of hub 10 and connected to sleeve 24. The adjustment mechanism consists of a body 62 having a relatively small cylindrical portion 64 disposed at the end of sleeve 24 and having an enlarged annular portion 66 connected to the cylindrical portion by radially extending member 68. The annular portion 66 is rotatably connected to sleeve 24 by a ball bearing 70 having an outer race 72 and an inner race 74, the outer race 72 being held in annular portion 66 by a groove 76 and snap-ring 78 seated in groove 80 in the internal surface of the annular portion and inner race 74 being held in place at the end of sleeve 24 by a groove 82 on the external surface of the sleeve and a snap-ring 84 seated in annular groove 86 in the external surface of the sleeve. The body 62 is held against rotation by a motion control arm 90 having a bifurcated end 92 for receiving a rod (not shown) which prevents the body 62 from rotating, but permits it to move longitudinally with respect to the hub as an adjustment is made in the speed of the sheave. Cylindrical portion 64 contains an end member 94 having a threaded central bore 96 for receiving the threaded end 98 of a shaft 100, the shaft being rotatably mounted in a pair of ball bearings 102 and 104, and the bearings being mounted in annular grooves 106 and 108, respectively, in the external surface of shaft 100, and being held in the respective grooves by snap-rings 110 and 112. The two bearings are seated in an enlarged portion of bore 12 of the hub, and bearing 102 is seated firmly against shoulder 114 at the inner end of the enlarged portion of the bore, and the two bearings are held in the enlarged portion of the bore by a snap-ring 116.

Adjustment cap 120 is rigidly secured to the end of shaft 100 by a square end 122 of the shaft extending into a square hole 124 in the end of cap 120 and by a screw 126 seating in threaded hole 128 in the end of shaft 100. It is thus seen that cap 120 and the shaft 100 rotate in unison whenever an adjustment in the speed of the sheave is made. Rotation of adjustment cap 120, which is provided with serrations 121, rotates shaft 100 which is held against axial movement by the securing means of bearings 102 and 104, and causes body 62 to move to the left or right as viewed in FIGURE 2 and to move sleeve 24 and flange 22 correspondingly to the left or right, depending upon which direction cap 120 is rotated. In the operation of the sheave, hub 10, sleeve 24 and the two flanges rotate in unison, and body 62, shaft 100 and cap 120 remain stationary with respect to the rotation of the hub, sleeve and flanges. The cap is sealed on the external surface of cylindrical portion 64 of body 62 by a sealing ring or gasket 130 seated in annular groove 132 in the internal surface of the adjustment cap. In order to retain the adjustment of flange 22 with respect to flange 14 after an adjustment has been made by the use of adjustment cap 120, shaft 100 and body 62, a detent 134 seated in a radially extending bore 136 and having a ball 138 is employed to seat in any one of a number of axially extending grooves 140 in the internal surface of the adjustment cap. The ball is spring loaded so that the cap can be turned in any position in making the adjustment, and thereafter yieldably held in its adjusted position by a spring loaded ball.

The sheave is preferably secured to a shaft by a securing means which fits closely to the flange so that no substantial overhang of the shaft beyond the bearing is required in order to securely mount the sheave. The securing means shown in the drawings consists of a split bushing 150 having an external tapered surface 152 for engaging a corresponding tapered surface 154 in bore 12 of hub 10, the split in the bushing consisting of a longitudinal slot 156 extending throughout the length thereof. An annular groove 158 is provided in the large outer end of the bushing and contains a snap-ring 160 having a substantial portion extending beyond the periphery of the bushing. A collar 162 having an internally extending flange 164 is threaded onto the end of hub 10 projecting to the left of flange 14 as viewed in FIGURE 2. The internally extending flange 164 is provided with an internal annular groove 166 in which the outer portion of snap-ring 160 seats. Rotation of collar 162 in the direction to move it toward flange 14 applies a force onto snap-ring 160 which in turn moves bushing 150 inwardly, thus causing the two tapered surfaces to be firmly in contact with one another, thereby restricting the bushing around the shaft in bore 12.

In the operation of the present sheave, after it has been mounted on a driving or driven shaft, an adjustment is made in the speed by shifting flange 22 toward or away from flange 14. This is accomplished by rotating adjustment cap 120 which in turn rotates shaft 100, the threaded surface thereof in bore 96 of body 62 moving the body to the right or left and shifting therewith sleeve 24 and flange 22. After an adjustment has been completed, the ball 138 of detent 134 seating in one of the axially positioned grooves 140 holds cap 120, body 62, sleeve 24 and flange 22 in the adjusted position until the flange is again intentionally reset for a different speed. As flange 22 is moved toward flange 14, belt 50 moves radially outwardly, thus increasing the speed of drive if the sheave is mounted on the driving shaft. Similarly, as flange 22 is moved away from flange 14, the belt moves inwardly, decreasing the speed of the drive, the selected speed in each instance being maintained by the detent 134 in the adjustment mechanism.

One of the advantages of the present invention is the accuracy and convenience with which the present adjustment can be made, since it employs a relatively small, easily controlled internal adjusting mechanism, including the small centrally located threaded shaft 100. Further, the parts of the adjustment mechanism are enclosed in body 62, and cap 120 protects these parts from dirt, grit and other foreign materials which inherently cause wear in moving parts.

While only one embodiment of the present invention has been described in detail herein, various changes and modifications may be made without departing from the scope of the invention.

We claim:

1. An adjustable pitch sheave for a V-belt, comprising a hub having a bore therethrough with one end tapered inwardly, a flange joined integrally with said hub at the end with the tapered portion of the bore and having a conical belt engaging surface, said hub having a longitudinal groove on its external surface, a sleeve slidably mounted on said hub and having a longitudinal groove on its inner surface, a flange joined integrally with the end of said sleeve adjacent said first mentioned flange and having a conical belt engaging surface facing the corresponding surface on said first mentioned flange, an anti-friction bearing interposed between said hub and sleeve, a key in said grooves, a shaft rotatably mounted in said hub bore and having a threaded portion extending from said bore in axial alignment with said hub, a body having a member with a threaded bore for receiving the threaded portion of said shaft and having an annular portion overlapping one end of said sleeve, a bearing means connecting said sleeve and said annular member, an arm on said body for preventing rotation thereof, an adjustment cap having an annular portion extending over a portion of said body and being connected to said shaft for rotating said shaft relative to said body to move said body along said threaded portion of the shaft and thereby to shift said sleeve and said second flange toward and away from said first flange, said adjustment cap having a detent for retaining a setting after an adjustment in the pitch of the sheave has been made, and a means mounted on said hub adjacent said first mentioned flange including a split tapered bushing for securing said sheave to a shaft.

2. An adjustable pitch sheave for a V-belt, comprising a hub having a bore therethrough with one end tapered inwardly, a flange secured to said hub at the end with the tapered portion of the bore, said hub having a longitudinal groove on its external surface, a sleeve slidably mounted on said hub and having a longitudinal groove on its inner surface, a flange secured to the end of said sleeve adjacent said first mentioned flange, a key in said grooves, a shaft rotatably mounted in said hub bore and having a threaded portion extending from said bore in axial alignment with said hub, a body having a member with a threaded bore for receiving the threaded portion of said shaft and having an annular portion overlapping one end of said sleeve, a bearing means connecting said sleeve and said annular member, an arm on said body for preventing rotation thereof, an adjustment cap having an annular portion extending over a portion of said body and being connected to said shaft for rotating said shaft relative to said body to move said body along said threaded portion of the shaft and thereby to shift said sleeve and said second flange toward and away from said first flange, said adjustment cap having a detent for retaining a setting after an adjustment in the pitch of the sheave has been made, and a means mounted on said hub adjacent said first mentioned flange including a split tapered bushing for securing said sheave to a shaft.

3. An adjustable pitch sheave for a V-belt, comprising a hub having a bore therethrough, a flange secured to said hub near one end thereof, said hub having a longitudinal groove on its external surface, a sleeve slidably mounted on said hub and having a longitudinal groove on its inner surface, a flange secured to the end of said sleeve adjacent said first mentioned flange, a key in said grooves, a shaft rotatably mounted in said hub bore and having a threaded portion extending from said bore in axial alignment with said hub, a body having a member with a threaded bore for receiving the threaded portion of said shaft and having an annular portion overlapping one end of said sleeve, a bearing means connecting said sleeve and said annular member, an arm on said body for preventing rotation thereof, an adjustment cap having an annular portion extending over a portion of said body and being connected to said shaft for rotating said shaft relative to said body to move said body along said threaded portion of the shaft and thereby to shift said sleeve and said second flange toward and away from said first flange, said adjustment cap having a detent for retaining a setting after an adjustment in the pitch of the sheave has been made, and a means mounted on said hub adjacent said first mentioned flange for securing said sheave to a shaft.

4. An adjustable pitch sheave for a V-belt, comprising a hub having a bore therethrough, a flange mounted on said hub, said hub having a longitudinal groove on its external surface, a sleeve slidably mounted on said hub and having a longitudinal groove on its inner surface, a flange mounted on the end of said sleeve adjacent said first mentioned flange, a key in said grooves, a shaft rotatably mounted in said hub bore and having a threaded portion, a body having a member with a threaded bore for receiving the threaded portion of said shaft and having an annular portion overlapping one end of said sleeve, a bearing means connecting said sleeve and said annular member, an arm on said body for preventing rotation thereof, and an adjustment cap having an annular portion extending over a portion of said body and being connected to said shaft for rotating said shaft relative to said body to move said body along said threaded portion of the shaft and thereby to shift said sleeve and said second flange toward and away from said first flange, said adjustment cap having a detent for retaining a setting after an adjustment in the pitch of the sheave has been made.

5. An adjustable pitch sheave for a V-belt, comprising a hub having a bore therethrough, a flange mounted on said hub, a sleeve slidably mounted on said hub, means for preventing relative rotation between said sleeve and hub, a flange mounted on the end of said sleeve adjacent said first mentioned flange, a shaft rotatably mounted in said hub bore and having a threaded portion, a body having a member with a threaded bore for receiving the threaded portion of said shaft and having an annular portion overlapping one end of said sleeve, a bearing means connecting said sleeve and said annular member, an arm on said body for preventing rotation thereof, and an adjustment means having an annular portion extending over a portion of said body and being connected to said shaft for rotating said shaft relative to said body to move said body along said threaded portion of the shaft and thereby to shift said sleeve and said second flange toward and away from said first flange, said adjustment means having a detent for retaining a setting after an adjustment in the pitch of the sheave has been made.

6. An adjustable pitch sheave, comprising a hub, a flange mounted on said hub near one end a bore in the end opposite said flange, a sleeve slidably mounted on said hub, means for preventing relative rotation between said sleeve and hub, a flange mounted on the end of said sleeve adjacent said first mentioned flange, a shaft rotatably mounted in said hub bore and having a threaded portion, a body having a member with a threaded bore for receiving the threaded portion of said shaft, bearing means connecting said sleeve and body, an arm on said body for preventing rotation thereof, and an adjustment means connected to said shaft for rotating said shaft relative to said body to move said body along said threaded portion of the shaft and thereby to shift said sleeve and said second flange toward and away from said first flange, said adjustment means having a means for retaining a setting after an adjustment in the pitch of the sheave has been made.

References Cited by the Examiner

UNITED STATES PATENTS

| | | | |
|---|---|---|---|
| 2,130,823 | 9/1938 | Wilson. | |
| 2,348,994 | 5/1944 | Otto | 74—230.17 |
| 2,495,078 | 1/1950 | Schweickart | 74—230.17 |
| 2,751,790 | 6/1956 | Ingold | 74—230.17 |
| 3,117,461 | 1/1964 | Fermier | 74—230.17 |

DAVID J. WILLIAMOWSKY, *Primary Examiner.*

L. H. GERIN, *Assistant Examiner.*